(12) United States Patent
Teshome et al.

(10) Patent No.: US 8,484,652 B2
(45) Date of Patent: Jul. 9, 2013

(54) SYSTEMS AND METHODS FOR TASK EXECUTION ON A MANAGED NODE

(75) Inventors: Abeye Teshome, Austin, TX (US); Aaron Merkin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 590 days.

(21) Appl. No.: 12/533,117

(22) Filed: Jul. 31, 2009

(65) Prior Publication Data

US 2011/0029979 A1    Feb. 3, 2011

(51) Int. Cl.
*G06F 9/46* (2006.01)
*G06F 9/44* (2006.01)
*G06F 9/455* (2006.01)
*G06F 1/00* (2006.01)
*G06F 1/32* (2006.01)

(52) U.S. Cl.
USPC ........... 718/103; 718/102; 717/171; 717/172; 717/176; 717/177; 713/320; 713/324; 713/340; 320/132; 320/134

(58) Field of Classification Search
USPC ....... 718/1–105; 713/300–340; 717/168–178; 320/127–136
See application file for complete search history.

(56) References Cited

U.S. PATENT DOCUMENTS

| | | | |
|---|---|---|---|
| 6,138,233 A | 10/2000 | Lim | 713/1 |
| 7,313,791 B1 * | 12/2007 | Chen et al. | 717/170 |
| 7,480,907 B1 * | 1/2009 | Marolia et al. | 717/174 |
| 7,584,508 B1 * | 9/2009 | Kashchenko et al. | 726/25 |
| 7,650,522 B2 * | 1/2010 | Linsley-Hood et al. | 713/321 |
| 7,987,449 B1 * | 7/2011 | Marolia et al. | 717/120 |
| 2005/0097376 A1 * | 5/2005 | Weinberger et al. | 713/320 |
| 2006/0007901 A1 * | 1/2006 | Roskowski et al. | 370/338 |
| 2006/0236325 A1 * | 10/2006 | Rao et al. | 719/315 |
| 2006/0279256 A1 * | 12/2006 | Bletsas | 320/128 |
| 2007/0088701 A1 * | 4/2007 | Rao | 707/8 |
| 2008/0081597 A1 * | 4/2008 | Cole | 455/414.1 |
| 2009/0187780 A1 * | 7/2009 | Keohane et al. | 713/324 |

* cited by examiner

*Primary Examiner* — Abdullah Al Kawsar
(74) *Attorney, Agent, or Firm* — Baker Botts L.L.P.

(57) ABSTRACT

Systems and methods for executing tasks on a managed node remotely coupled to a management node are provided. A management controller of the management node may be configured to determine at least one execution policy for a task, schedule the task for execution, receive system information data from the managed node, based at least on the received system information, determine if the received system information complies with the at least one execution policy, and if the received information complies with the at least one execution policy, forward the task from the management controller to the managed node for execution.

14 Claims, 2 Drawing Sheets

SYSTEMS AND METHODS FOR TASK EXECUTION ON A MANAGED NODE

TECHNICAL FIELD

The present disclosure relates to out-of-band updates and more particularly to systems and methods for task execution on a managed node over an out-of-band channel.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as, but not limited to, financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems are currently used for and/or include devices for wireless communications. For example, an information handling system may be cell phone, smart phone, a personal digital assistant (PDA), and/or another similar portable wireless device that may be used for wireless communication via, for example, a carrier. As another example, the information handling system may be a computer, laptop, notebook, or other device that may include one or more wireless cards for wireless communications via any number of different wireless communication protocols, e.g., wireless LAN (WLAN), wireless WAN (WWAN), Bluetooth, Ultra Wide-Band, global positioning system (GPS), etc.

With the introduction of out-of-band (OOB) management technologies, it is becoming possible to perform management tasks on the information handling system without the knowledge or approval of the end user. While the capabilities provide some advantages, concerns of battery life preservation for the information handling system remain. Furthermore, certain tasks, e.g., a BIOS flash task, may be non-recoverable if an error such as, for example, the powering off of the information handling system due to low battery life occurs.

SUMMARY

In accordance with certain embodiments of the present disclosure, a management controller for managing execution of a task on a managed node coupled to the management controller is provided. The management controller may be configured to determine at least one execution policy for a task, schedule the task for execution, receive system information data from the managed node, based at least on the received system information, determine if the received system information complies with the at least one execution policy, and if the received information complies with the at least one execution policy, forward the task from the management controller to the managed node for execution.

In accordance with other embodiments of the present disclosure, a method for managing execution of a task on a managed node is provided. The method may include, determining, by a management controller communicatively coupled to the managed node, at least one execution policy for the task, scheduling, by the management controller, a task for execution, receiving system information from the managed node, based at least on the received system information, determining, by the management controller, if the received system information complies with the at least one execution policy, and if the received system information complies with the at least one execution policy, forwarding the task from the task server to the managed node for execution.

In accordance with other embodiments of the present disclosure, an information handling system may include a processor, memory coupled to the processor, and a management controller coupled to the processor. The management controller may be configured to determine at least one execution policy for a task, schedule the task for execution, receive system information data from a managed node communicatively coupled to the information handling system, based at least on the received system information, determine if the system information complies with the at least one execution policy, and if the received system information complies with the at least one execution policy, forward the task to the managed node for execution.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
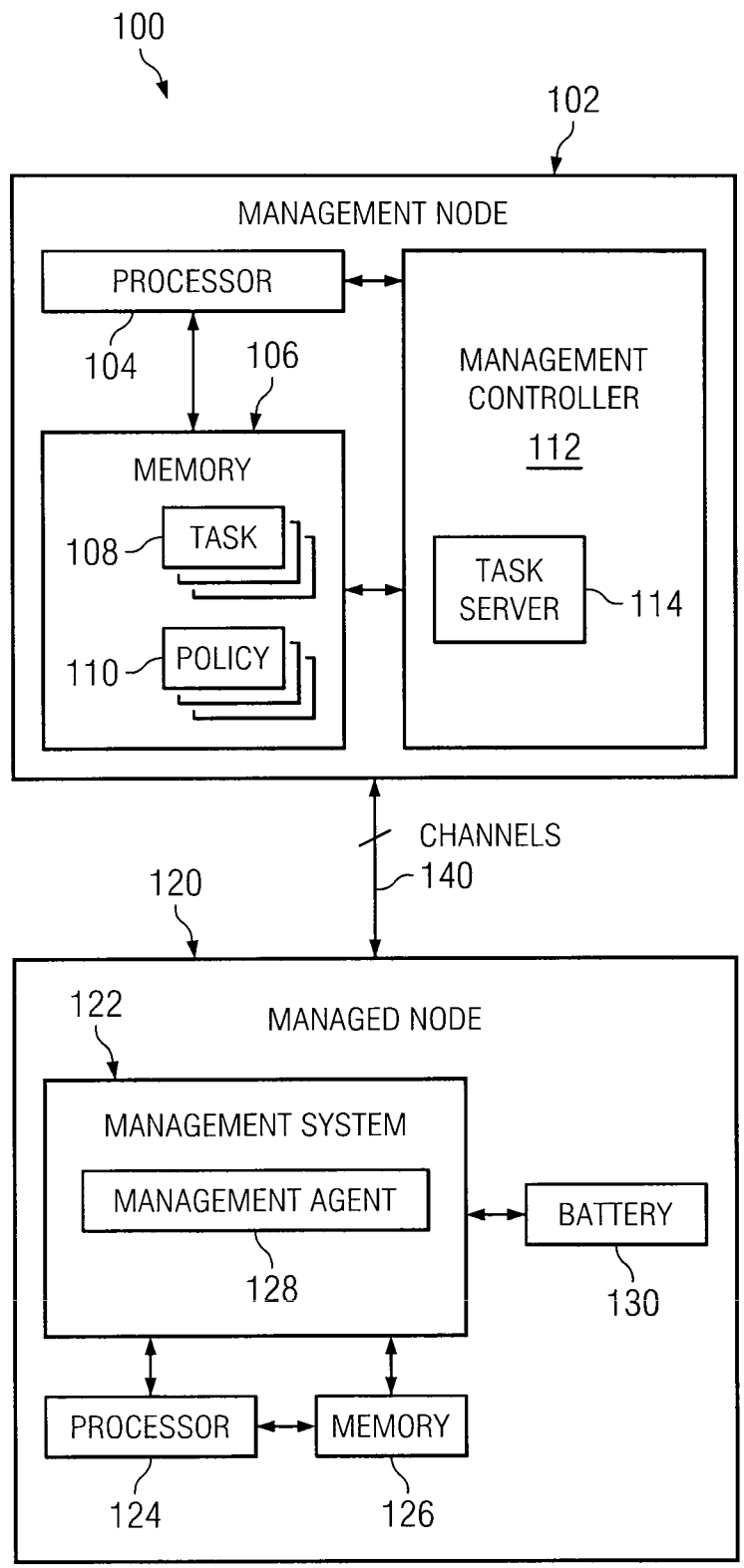
FIG. 1 illustrates a block diagram of an example system including a management node and a managed node, wherein the system is configured for executing a task provided by the management node on the managed node, in accordance with certain embodiments of the present disclosure.
Figure 2:
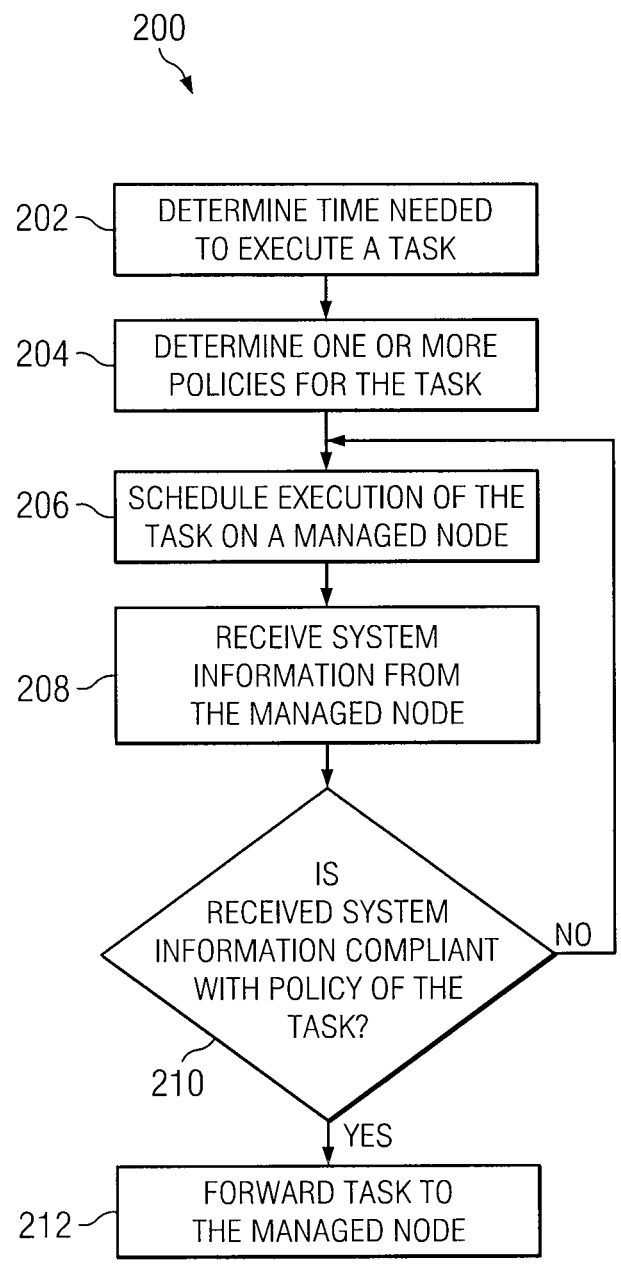
FIG. 2 illustrates a flow chart of an example method for task execution on a managed node, in accordance with certain embodiments of the present disclosure.

Preferred embodiments and their advantages are best understood by reference to FIGS. 1 and 2, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and/or a video display. The information handling system may also include one or more buses operable to transmit communications between the various hardware components.

FIG. 1 illustrates a block diagram of an example system 100 for executing a task on a managed node 120, in accordance with certain embodiments of the present disclosure. As shown in FIG. 1, system 100 may include a management node 102 and one or more managed nodes 120.

Management node 102 may be a server (e.g., a network management server), database, or other information handling system that may be remotely coupled to managed node 120 via one or more channels 140. Management node 102 may include a processor 104, memory 106, and a management controller 112. Processor 104 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor(s) 104 may interpret and/or execute program instructions and/or process data, for example, data stored in, memory 106, management controller 112, and/or another component of system 100. Processor 104 may output results via graphical user interfaces (GUIs), websites, and the like via a display, over channels 140 (e.g., out of band channels and/or in-band channels), and/or over a network port.

Memory 106 may be coupled to processor 104 and may comprise any system, device, or apparatus operable to retain program instructions or data for a period of time. Memory 106 may include random access memory (RAM), electrically erasable programmable read-only memory (EEPROM), a PCMCIA card, flash memory, or any suitable selection and/or array of volatile or non-volatile memory configured to retain data after power to management node 102 is turned off. In some embodiments, memory 106 may store program instructions, task(s) 108, policy(ies) 110 data, and/or other data.

Management controller 112 may include any system, device, apparatus, firmware, and/or application (e.g., a program of instructions executable by a processor, for example, processor 104) configured to receive, generate, and/or profile tasks (e.g., determine characteristics of the generated or received tasks) for execution by a task server 114 coupled to controller 112, wherein each task 108 may include one or more corresponding policies 110 associated with task 108. Details of the one or more policies are described in greater detail below. For purposes of this disclosure, a task may include a software update, a firmware update, a security patch, an operating system update, a network update, a multimedia download and/or installation, and/or other suitable updates, downloads, fixes, etc., for managed node 120.

Management controller 112 and/or task server 114, in generating and/or profiling task 108, may determine a run time for task 108. In one embodiment, the run time may be an estimation. In the same or alternative embodiments, the run time may be established by executing task 108 and determining the time period required to complete task 108 (e.g., by determining an average based on several executions of task 108). Task 108 and its determined run time may be stored in memory 106.

In some embodiments, the run time may also be provided by a vendor who generated a particular task 108. A vendor-provided task 108 may be provided to management node 102 and stored, for example, in memory 106. Upon execution of vendor-provided task 108, processor 104 may access vendor-provided task 108 from memory 106, and may provide the vendor-provided task 108 to management controller 112 and/or task server 114.

Task server 114 may be coupled to or integrated with management controller 112 and may be any system, device, apparatus, firmware, and/or (e.g., a program of instructions executable by a processor) configured to create and/or receive one or more policies 110 associated with each task 108. For example, task server 114 may determine the time needed to execute task 108, the available network bandwidth between management node 102 and managed node 120, and/or the type of task (e.g., a security patch task, a firmware update task, a software update task, etc.). Based at least on the determination made by task server 114, one or more policies may be generated for each task 108.

Task server 114 and/or an administrator of management node 102 may also create one or more policies 110 based on the criticality of task 108. For example, if task 108 is a critical security patch, a policy 110 may be created to allow task 108 to run on managed node 120 even if the battery life of the managed node 120 would be depleted upon completion of the executed task. The one or more policies may subsequently be stored in memory 106.

In some embodiments, management controller 112 and/or task server 114 may calculate the network bandwidth between management node 102 and managed node 120. The calculated network bandwidth may be used to determine how long it may take to send a scheduled task 108 to managed node 120 and as such, a total execution time of scheduled task 108.

Managed node 120 may be coupled to management node 102 via channels 140 (e.g., in-band channels and/or out-of-band channels) and may be configured to receive and/or execute tasks from management node 102. In some embodiments, managed node 120 may be an information handling system. For example, managed node 120 may be a portable information handling system (e.g., a tablet computer, a notebook computer, a cellular phone, a smart phone, a personal digital assistant (PDA), etc.).

Managed node 120 may include processor 124, memory 126, management system 122, and battery 130. Processor 124 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 124 may interpret and/or execute program instructions and/or process data, for example, data stored in memory 126 and/or another component of system 100. Processor 124 may output results via graphical user interfaces (GUIs), websites, and the like via a display, over channels 140 (e.g., out of band channels and/or in-band channels), and/or over a network port.

Memory 126 may be coupled to management system 122 and/or processor 124 and may comprise any system, device, or apparatus operable to retain program instructions or data for a period of time. Memory 126 may include random access memory (RAM), electrically erasable programmable read-only memory (EEPROM), a PCMCIA card, flash memory, or any suitable selection and/or array of volatile or non-volatile memory configured to retain data after power to managed node 120 is turned off. In some embodiments, memory 126 may store program instructions and/or other data.

Management system 122 coupled to processor 124 may be any system, device, apparatus, firmware, and/or application (e.g., a program of instructions executable by a processor) configured to determine, among other things, information regarding managed node 120. For example, management system 122 may determine an estimated availability (e.g., battery life of battery 130) and/or network connectivity information of managed node 120. In some embodiments, management system 122 may be an out-of-band management controller. In the same or alternative embodiments, management system 122 may be a set of instructions of an operating system executed by processor 124 on managed node 120.

Management agent 128 may be coupled to or integrated with management system 122 and may be any system, device, apparatus, firmware, and/or (e.g., a program of instructions executable by a processor, for example, processor 124) configured to collect data requested by, for example, management controller 112 of management node 102. In some embodiments, management agent 128, separately or combined with management system 122 may determine various information regarding managed node 120 and provide the information to management node 102. For example, management agent 128 and/or management system 122 may determine an estimated availability time, network connectivity information, and/or other information related to managed node 120 and may forward the information as requested by management node 102 via channel(s) 140.

To determine the estimated availability time of managed node 120, management system 122 and/or management agent 128 may, for example, determine the capacitance rating of battery 130 and/or the current consumption of managed node 120. Management system 122 may determine the amount of battery life remaining in terms of the number of minutes of battery life remaining, percentage of battery life remaining, and/or other appropriate metric.

In the same or alternative embodiments, management system 122 and/or management agent 128 may use an operating system (OS) running on managed node 120, and in particular, may use an interface of the OS (e.g., application programming interface, API) to determine the battery life data of battery 130. Any other suitable techniques to determine the battery life data may also be used.

Management system 122 and/or management agent 128 may also receive a request from management node 102, for example, from management controller 112 and/or task server 114, to determine how long managed node 120 is likely to stay coupled to a network. Management agent 128 may prompt a user of managed node 120 via, for example, a user interface. Alternatively, management agent 128 may use historical data maintained and stored in memory 126 that provides average usage data, network data, and/or other network connectivity data of managed node 120. For example, the historical data may include physical location information for managed node 120 with location sensing capabilities. The physical location information may enable management controller 112 to determine if network connectivity is available for the physical location. As another example, the historical data may include network information (e.g., DHCP server MAC, network domain, wireless network identification, etc.). The network connectivity information may be forwarded via channel(s) 140 to management node 102.

Battery 130 may include any system, device, or apparatus configured to store electrochemical, electromechanical, or other forms of energy and may provide electrical energy to one or more components of managed node 120. In some embodiments, battery 130 may be a rechargeable battery, meaning that its electrochemical energy may be restored by the application of electrical energy (e.g., a lead and sulfuric acid battery, nickel cadmium (NiCd) battery, nickel metal hydride (NiMH) battery, lithium ion (Li-ion) battery, lithium ion polymer (Li-ion polymer) battery, smart battery, or any combination of the foregoing, or any other suitable battery).

In operation, after one or more tasks are created and/or received from a vendor by management controller 112 and/or task server 114, and after one or more policies are determined for each task 108 by management controller 112 of management node 102, a particular task 108 may be scheduled on task server 114 for managed node 120. Management controller 112 and/or task server 114 may query management system 122 and/or management agent 128 of managed node 120 via channel(s) 140 for the estimated availability time of managed node 120 (e.g., battery life data), network connectivity information, and/or other information relating to managed node 120. Upon receiving the requested information, management controller 112 and/or task server 114 may determine whether or not to execute the scheduled task 108 by comparing the requested information with associated policy or policies 110 of the scheduled task 108. For example, if the task 108 is a software update and takes approximately 45 minutes to execute, the policy may require that the battery life of battery 130 to be greater than 90 minutes, such that managed node 120 may still be functional after the scheduled task 108 is executed.

If the determined requested information satisfies one or more policies 110 for the scheduled task 108 to be executed, management controller 112 may retrieve the scheduled task 108 from memory 106 and communicate the scheduled task 108 to management agent 128 via channel(s) 140 such that the task 108 can be executed, e.g., by processor 124.

If the requested information fails to meet the standards set forth by one or more policies 110 for the scheduled task 108 to be executed, task server 114 may reschedule the task 108 in a queue, such that at a later time (e.g., when sufficient battery life and/or network bandwidth is/are available), the scheduled task 108 may be communicated to management agent 128 of managed node 120 for execution.

In some embodiments, even if the requested information does not meet the policy(ies) 110 for the scheduled task 108, a corresponding policy 110 associated with the scheduled task 108 may allow for the communication of the scheduled task 108 to managed node 120 for execution. For example, if the scheduled task 108 is a critical security patch, and the execution of the security patch may leave managed node 120 with low battery life, task server 120 may nonetheless communicate the task 108 to managed node 120 for execution.

It is noted that all or any portion of the requested information from managed node 120, including, for example, estimated availability time and/or network connectivity information, separately or combined with network bandwidth data determined by management controller 112 and/or task server 114 may be used to determine whether to send task 108 to managed node 120. For example, the information received and collected by management controller 112 and/or task server 114 may be compared with one or more policies 110 associated with task 108.

FIG. 2 illustrates a flow chart of an example method 200 for task execution on a managed node (e.g., managed node 120), in accordance with certain embodiments of the present disclosure. At step 202, management controller 112 in general, and in particular, task server 114 may determine the time needed to execute task 108 (e.g., vendor-created task and/or a task generated by management controller 112). Task 108 may be an update, download, security patch, and/or other suitable operation to be executed at managed node 120.

In some embodiments, a vendor-created task may include the execution time of the task. Task server 114 and/or management controller 112 may retrieve the execution time stored, for example, at memory 106. Alternatively, management controller 112 and/or task server 114 may estimate the execution time. For example, the management controller 112 and/or task server 114 may execute the task and determine an execution time based on the time required to complete execution. In other embodiments, management controller 112 and/or task server 114 may execute the task multiple times and determine an average execution time.

In the same or alternative embodiments, task server 114 and or management controller 112 may calculate the network bandwidth between management node 102 and managed node 120. The calculated network bandwidth may be used to determine the time required to send the task to managed node 120. The time calculated send time may also be used to determine a total execution time needed to execute task 108 on managed node 120.

At step 204, one or more policies 110 may be established for task 108. In some embodiments, the one or more policies 110 may define a minimum availability time required of managed node 120 (e.g., minutes of battery life remaining, a percentage of battery life remaining, or other appropriate metric) that is acceptable to execute the task (e.g., to allow a managed node 120 to be functional for some time period after the execution of the task). In the same or alternative embodiments, the one or more policies 110 may indicate that a task is to be executed, even if the life of battery 130 is expected to be depleted upon completed execution of the task (e.g., a critical task such as a security patch that is immediately required and/or needed by managed node 120).

At step 206, management controller or task server 114 may schedule the task for execution on managed node 120. At step 208, upon the scheduling of the task, management controller 112 and/or task server 114 may request system information from managed node 120. In some embodiments, the system information may include an estimated availability time of managed node 120 (e.g., battery life data of battery 130). Managed node 120 may directly communicate with battery 130 to determine the battery life data and/or may use an application programming interface (API) to determine the battery life data associated with battery 130.

In the same or alternative embodiments, the system information may include network connectivity information of managed node 120. The network connectivity information may be directly provided by a user of managed node 120 via a user interface and/or may include historical information gathered by management system 122 and/or management agent 128.

In some embodiments, managed node 120 may automatically communicate to management node 102, and in particular, management controller 112 various system information of managed node 120. For example, automatic communication of battery life data, network connectivity information, and/or other system-related information may be performed at a predetermined time interval. Alternatively, battery life data, network connectivity information, and/or other system-related information may be automatically communicated in connection with at an event, for example, a power up sequence of managed node 120 (e.g., waking from sleep mode, waking from hibernation mode, or booting from a full powered down mode, etc.). The automatic data provided by managed node 120 may allow management node 102 to dynamically communicate pending or upcoming tasks scheduled for execution by managed node 120.

At step 210, if the information related to managed node 120 does not comply with the policy 110 associated with the scheduled task 108 (e.g., the determined battery life is less than that required for execution of the task 108), method 200 may proceed again to step 206, where the task may be rescheduled for a later time. If the received information related to managed node 120 complies with the one or more policies 110 associated with the scheduled task 108 (e.g., the determined battery life is equal to or greater than that required for execution of the task 108), method 200 may proceed to step 212.

At step 212, in response to a determination that the received system information from managed node 120 complies with the one or more policies 110 associated with the schedules task 108, the scheduled task 108 may be retrieved from memory 106 and communicated to managed node 120 via channel(s) 140 (e.g., an out-of-band channel), where the scheduled task 108 may be managed by management agent 128 and/or executed by processor 124.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order. In addition, steps 202-212 may be repeated, independently and/or collectively, as often as desired or required by a chosen implementation.

The present disclosure provides systems and methods for out-of-band execution of tasks on a managed node. The systems and methods for executing these tasks may be performed statically, e.g., by determining the battery life data of a battery, network connectivity information, network bandwidth data, etc., and based on the received data, determining whether or not to execute the task. The systems and methods for executing tasks on the managed node may also be performed dynamically, e.g., by receiving battery life data and/or network connectivity information from the managed node at a predetermined time or event, and based on the received data, determine if any pending or upcoming task can be forwarded for execution.

Although the present disclosure has been described in detail, it should be understood that various changes, substitutions, and alterations may be made hereto without departing from the spirit and the scope of the invention as defined by the appended claims.

What is claimed is:

1. A non-transitory computer readable medium storing instructions for managing execution of a task on a managed node communicatively coupled over a network to a management controller, the instructions, when executed by the management controller configured to:

determine at least one execution policy for the task prior to forwarding the task to the managed node over the network, wherein the at least one execution policy comprises:
a minimum battery life of the managed node required for the task execution;
a criticality, of the task based on whether the task is a security patch for the managed node; and
a required residual battery life of the managed node following the task execution, wherein the required residual battery life of the managed node adjusts based on the criticality of the task;
schedule the task for execution;

receive, by the management controller, system information data from the managed node, wherein the system information comprises network connectivity information of the managed node;

based at least on the received system information, determine if the received system information complies with the at least one execution policy; and if the received system information complies with the at least one execution policy, forward the task from the management controller to the managed node for execution.

2. The non-transitory computer readable medium of claim 1, wherein the at least one execution policy includes an execution time for the task, and wherein the management controller is further configured to determine the execution time based at least on one of:

a time for sending the task scheduled to the managed node over the network; and a time for executing the task on the managed node.

3. The non-transitory computer readable medium of claim 2, wherein the execution time for the task includes a time to communicate the task from the management controller to the managed node over the network.

4. The non-transitory computer readable medium of claim 1, wherein receiving the system information from the managed node includes receiving, at predetermined time intervals, battery life data of a battery of the managed node.

5. The non-transitory computer readable medium of claim 4, wherein the management controller is configured to automatically communicate the task to the managed node for execution upon receiving the system information data at the predetermined time intervals.

6. A method for managing execution of a task on a managed node, the method comprising:

determining, by a management controller communicatively coupled over a network to the managed node, at least one execution policy for the task prior to forwarding the task to the managed node over the network, wherein the at least one execution policy comprises:

a minimum battery life of the managed node required for the task execution;

a criticality of the task based on whether the task is a security patch for the managed node; and a required residual battery life of the managed node following the task execution, wherein the required residual battery life of the managed node adjusts based on the criticality of the task;

scheduling, by the management controller, the task for execution;

receiving, by the management controller, system information data from the managed node, wherein the system information comprises network connectivity information of the managed node;

based at least on the received system information, determining, by the management controller, if the received system information complies with the at least one execution policy; and if the received system information complies with the at least one execution policy, forwarding the task from the management controller to the managed node for execution.

7. The method of claim 6, wherein determining the at least one execution policy includes determining an execution time for the task, and wherein the method further comprises determining the execution time, by the management controller, based at least on one of:

a time for sending the task scheduled to the managed node over the network; and a time for executing the task on the managed node.

8. The method of claim 7, wherein the execution time for the task includes a time to communicate the task from the management controller to the managed node over the network.

9. The method of claim 6, wherein receiving the system information from the managed node comprises receiving, at a predetermined time interval, battery life data of a battery of the managed node.

10. The method of claim 9, further comprising automatically communicating the task to the managed node for execution upon receiving the system information at the predetermined time interval.

11. An information handling system, comprising:

a processor;

memory coupled to the processor; and a management controller communicatively coupled to a managed node over a network and the management controller coupled to the processor and configured to:

determine at least one execution policy for a task prior to forwarding the task to the managed node over the network, wherein the at least one execution policy comprises:

a minimum battery life of the managed node required for the task execution;

a criticality of the task based on whether the task is a security patch for the managed node; and a required residual battery life of the managed node following the task execution, wherein the required residual battery life of the managed node adjusts based on the criticality of the task;

schedule the task for execution;

receive, by the management controller, system information data from the managed node, wherein the system information comprises network connectivity information of the managed node;

based at least on the received system information, determine if the system information complies with the at least one execution policy; and if the received system information complies with the at least one execution policy, forward the task to the managed node for execution.

12. The information handling system of claim 11, wherein the at least one execution policy includes an execution time for the task, and wherein the management controller is further configured to determine the execution time based at least on one of:

a time for sending the task scheduled to the managed node over the network; and a time for executing the task on the managed node.

13. The information handling system of claim 11, wherein receiving the system information from the managed node includes receiving, at a predetermined time interval, battery life data of a battery of the managed node.

14. The information handling system of claim 13, the management controller further configured to automatically communicate the task to the managed node for execution upon receiving the system information at the predetermined time intervals.

* * * * *